US008651406B2

(12) United States Patent
So (10) Patent No.: US 8,651,406 B2
(45) Date of Patent: Feb. 18, 2014

(54) CONDIMENT GRINDER

(75) Inventor: Kwok Fai So, Hong Kong (CN)

(73) Assignee: Ki Mee Kitchenware Limited, Kowloon, Hong Kong SAR (CN)

( * ) Notice: Subject to any disclaimer, the term of this patent is extended or adjusted under 35 U.S.C. 154(b) by 416 days.

(21) Appl. No.: 13/179,744

(22) Filed: Jul. 11, 2011

(65) Prior Publication Data

US 2013/0015279 A1    Jan. 17, 2013

(51) Int. Cl.
*A47J 42/04* (2006.01)
(52) U.S. Cl.
USPC ....................................................... 241/169.1
(58) Field of Classification Search
USPC ....................................................... 241/169.1
See application file for complete search history.

(56) References Cited

U.S. PATENT DOCUMENTS

| 7,168,170 | B1 | 1/2007 | So et al. |
| 2010/0314477 | A1* | 12/2010 | Fong .......................... 241/169.1 |
| 2012/0153060 | A1 | 6/2012 | Ng |

* cited by examiner

*Primary Examiner* — Shelley Self
*Assistant Examiner* — Matthew G Katcoff
(74) *Attorney, Agent, or Firm* — Leydig, Voit & Mayer, Ltd.

(57) ABSTRACT

A pepper grinder has a body, a grinding mechanism, and a drive mechanism for operating the grinding mechanism by causing relative movement between two grinding members. The drive mechanism has a lever for reciprocating pivotal movement in opposite directions to produce a driving force, a first ratchet arranged to transmit the driving force from the lever, upon pivoting of the lever in the first direction, causing relative movement between the grinding members in a third direction to grind pepper, and a second ratchet arranged to transmit the driving force from the lever, upon pivoting of the lever in the second direction, causing relative movement between the grinding members in the third direction to grind pepper. Upon reciprocating pivoting of the lever in the opposite directions, the first and second ratchets alternate in transmitting the driving force from the lever to the grinding mechanism.

19 Claims, 6 Drawing Sheets

CONDIMENT GRINDER

The invention relates to a manually operable condiment grinder and in particular, but not exclusively, to a pepper grinder.

BACKGROUND OF THE INVENTION

Condiment grinders are in abundant use, on almost every dining table or whenever a meal is served. In a typical construction of the hand-operated condiment grinders, primarily pepper grinders and salt grinders, there is a turning knob at the top for turning to operate the grinder mechanism in the grinder. Not every stroke of the turning knob is productive; the return stroke does not operate the grinding mechanism at all because most if not all grinding mechanisms are directional.

The invention seeks to obviate or at least alleviate such a problem or shortcoming by providing a new or improved condiment grinder.

SUMMARY OF THE INVENTION

According to the invention, there is provided a condiment grinder comprising a body for containing condiment, a grinding mechanism for grinding condiment from the body, the grinding mechanism comprising first and second grinding members between which said condiment is ground upon relative movement between the first and second grinding members, and a drive mechanism for driving and operating the grinding mechanism by causing relative movement between the first and second grinding members to grind said condiment. The drive mechanism comprises an operating member supported for reciprocating movement in opposite first and second directions relative to the body to produce drive, a first ratchet arranged to transmit drive from the operating member, upon pivotal movement of the operating member in the first direction, for causing relative movement between the first and second grinding members in one direction to grind condiment, and a second ratchet arranged to transmit drive from the operating member, upon pivotal movement of the operating member in the second direction, for causing relative movement between the first and second grinding members in the same direction to grind condiment. Upon reciprocating movement of the operating member in the opposite first and second directions, the first and second ratchets take turns to transmit drive from the operating member to the grinding mechanism.

Preferably, the grinding mechanism includes an operating shaft in drive engagement with the first grinding member and supported for movement to move the first grinding member relative to the second grinding member.

More preferably, the first grinding member is supported co-axially in the second grinding member for rotation relative thereto, the two grinding members being spaced apart by an annular gap in which condiment is to be ground.

More preferably, the first and second ratchets are arranged to translate the reciprocating movement of the operating member in the opposite first and second directions into unidirectional rotary movement of the operating shaft.

In a preferred embodiment, the drive mechanism includes a first gear train in a first drive transmission path from the operating member to the operating shaft and including the first ratchet, and a second gear train in a second drive transmission path from the operating member to the operating shaft and including the second ratchet, the first and second gear trains being for transmitting drive from the operating member alternately via the first and second ratchets respectively to the operating shaft.

More preferably, the first gear train is in drive engagement between the first ratchet and the operating shaft, the second gear train is in drive engagement between the second ratchet and the operating shaft.

More preferably, the first and second gear trains share a common gear in drive engagement with the operating shaft.

Further more preferably, the common gear comprises a gearwheel having opposite left and right sides about its centre, the left side of the gearwheel being part of the first gear train and the right side of the gearwheel being part of the second gear train.

Yet further more preferably, the first and second gear trains include respective beveled gearwheels rotatable about a common axis and in mesh with the opposite left and right sides of the common gear which is also a beveled gearwheel.

It is preferred that the gears of the first and second gear trains, other than the common gear, are supported for rotation about a single axis.

It is further preferred that the first and second ratchets are also supported for turning about the single axis.

In a preferred embodiment, the first and second ratchets are arranged for operation on opposite sides of the operating member and are operable in opposite directions.

More preferably, each of the first and second ratchets includes a driving part movable with the operating member and a driven part in drive engagement with the first or second gear train respectively.

It is preferred that each of the first and second ratchets includes a driving part and an associated driven part, the driving parts being supported for simultaneous turning about a common axis and arranged back-to-back with their outer sides bearing ratchet teeth skewed in opposite directions for ratchet operation with co-operating skewed ratchet teeth of the associated driven parts in opposite directions.

It is preferred that the operating member is supported for reciprocating angular movement in the opposite first and second directions relative to the body.

It is further preferred that the operating member comprises a lever having an inner end associated with the drive mechanism and an outer end for manual operation.

It is yet further preferred that the lever is pivotable through an angle greater than 120°.

In a preferred embodiment, the condiment grinder includes a head above the body in which the drive mechanism is provided, and a base below the body in which the grinding mechanism is provided.

The condiment grinder may be a handheld pepper grinder.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Referring to the drawings, there is shown a condiment grinder in the form of, for example, a pepper grinder embodying the invention, which has an upright cylindrical body 100 for containing peppercorns, a dome-shaped head 200 attached to an upper end 110 of the grinder body 100, and a cylindrical base 400 attached to an open lower end 120 of the grinder body 100 for standing the overall grinder on a horizontal surface e.g. a tabletop. These three parts 100, 200 and 400, preferably made of plastics material, together constitute a casing of the pepper grinder and have matching diameters to form a smooth profile about a common vertical central axis. The pepper grinder is handheld in use.

The grinder body 100 has a central hole 111 at its upper end 110. There is also a side opening 101 which is closed by a detachable lid 102 having a knob 107 and through which the grinder body 100 may be replenished with peppercorns. The lid 102 has a pair of symmetrical left and right side wings 103 extending rearwardly, on each of which there are a bottom peg 104 hingedly connecting the lid 102 to the grinder body 100, a front lump 105 for snapping to hold the lid 102 closed, and a rear protrusion 106 for retaining the lid 102 open. The wings 103 may be squeezed to permit detachment or re-attachment of the lid 102.

The base 400 is formed by an inverted cylindrical can 410 having, at its upper end, a central hole 411 over a considerably larger aperture 412, and a circular base cover 420 across inside the can's lower end, having an aperture 422 of similar size as the upper aperture 412. The two apertures 412 and 422 permit passage of pepper through the base 400.

The pepper grinder includes a grinding mechanism 300 that is housed generally in the base 400. The grinding mechanism 300 has a metal operating shaft 310 of a square cross-section, which extends vertically upwardly from inside the base 400, through the central hole 411 thereof, and co-axially through the grinder body 100 to reach just below the head 200 above. Co-axially about the central axis of the grinder body 100, the head 200 incorporates a drive mechanism 500 for turning the shaft 310, by its uppermost end, to drive and operate the grinding mechanism 300.

The grinding mechanism 300 includes a pair of co-operating outer and inner grinding members 370 and 380, between which peppercorns are ground upon relative movement between the grinding members 370 and 380. The grinding members 370 and 380, preferably made of metal or porcelain material, are housed co-axially in the base 400, through which the lower end of the operating shaft 310 engages.

The outer grinding member 370 has a generally cylindrical annular body whose inner surface has frusto-conically shaped upper and lower parts converging towards each other, on which respective slightly skewed teeth 371 and 372 are formed. The grinding member 370 is located by the lid 420 co-axially in the base 400, and is fixed.

The inner grinding member 380 has a generally frusto-conical body, which has a square central bore engaging the shaft 310 for rotation by and with the shaft 310, and whose outer surface has upper and lower parts formed with respective skewed teeth 381 and 382. This grinding member 380 is located co-axially inside the outer grinding member 370, being spaced apart therefrom by an annular gap and in particular a frusto-conical gap between their lower teeth 382 and 372.

Peppercorns from the grinder body 100 enter the base 400 through its upper aperture 412 and into the annular gap between the grinding members 370 and 380. In the annular gap, the peppercorns are ground as the inner grinding member 380 is turned by the operating shaft 310 relative to the outer grinder member 370 and is then dispensed through the lower aperture 422 of the base 400.

The upper teeth 371 and 381 are relatively coarse and co-operate to draw in and crush the peppercorns, whereas the lower teeth 372 and 382 are relatively fine and co-operate to grind the crushed peppercorns further into much smaller pieces i.e. powdered pepper for serving.

With the outer grinding member 370 fixed inside the base 400, the inner grinding member 380 is inserted from below into the outer grinding member 370 and is resiliently biased therefrom by a compression coil spring 390 on the operating shaft 310. The inner grinding member 380 is retained by a screw nut 320 in screw engagement with the lowermost end of the shaft 310. The screw nut 320 may be turned to alter the axial position of the inner grinding member 380 on the shaft 310 relative to the outer grinding member 370. This changes the gap width between the lower teeth 372 and 382 of the two grinding members 370 and 380 and in turn adjusts the pepper grinding size between fine and coarse.

The inner grinding member 380 is floating, i.e. not fixed to the in vertical direction, relative to the outer grinding member 370, being resiliently biased upwards by the spring 390. This arrangement allows a certain degree of freedom for the inner grinding member 380 to maneuver, thereby reducing the risk of jamming.

Turning to the head 200, it has a dome-shaped casing 210 closed by a circular base 220, together defining an interior that accommodates the drive mechanism 500. The casing 210 has a slot 211 which extends across opposite sides of the dome-shaped wall of the casing 210, and the base 220 has a central hole 221.

The drive mechanism 500 is manually operated by means of an operating member, which takes the form of a lever 530 in the described embodiment and is supported for reciprocating angular movement in opposite left and right directions relative to the grinder body 100, thereby producing drive. The lever 530 sticks out from the head 200 through the latter's slot 211, having an inner end 531 associated with the drive mechanism 500 and an outer end 532 for manual operation.

The lever 530 is formed or connected with a (metal) shaft 501, which extends along a horizontal axis X transversely to opposite sides of the lever's inner end 531 and about which the lever 530 is pivotable to the opposite left and right sides, or in the left and right directions, relative to the grinder body 100. Inside the head 22, the shaft 501 is supported at its opposite ends, like trunnions, through the use of respective ring bearings 502 on a pair of bearing blocks 222 on the base 220.

The drive mechanism 500 further includes, internally of the head 200, a pair of first and second ratchets 510 and 520, a first gear train 540/560 and a second gear train 550/560. The first gear train 540/560 is in a first drive transmission path from the lever 530 to the operating shaft 310 and including the first ratchet 510, and is in drive engagement between the first ratchet 510 and the shaft 310. The second gear train 550/560 is in a second drive transmission path from the lever 530 to the shaft 310 and including the second ratchet 520, and is in drive engagement between the second ratchet 520 and the shaft 310.

The first ratchet 510 includes a driving part 511 movable with the operating lever 530 and a driven part 512 in drive engagement with the first gear train 540/560. The second ratchet 520 includes a driving part 521 movable with the lever 530 and an associated driven part 522 in drive engagement with the second gear train 550/560.

The two driving parts 511 and 521 are circular disc-like and are attached on opposite sides of the inner end 531 of the lever 530, being in axial alignment with each other along the axis X for simultaneous turning about the shaft 501. They are arranged back-to-back about the lever's inner end 531, with their toothed sides facing outwards. The driven parts 512 and 522 are like square washers and are disposed on opposite ends of the shaft 501, with their toothed sides facing inwards and bearing resiliently against the toothed sides of the respective driving parts 511 and 521.

With all their driving and driven parts 511/512/521/522 disposed on the shaft 501, the ratchets 510 and 520 are both supported for turning about the single common axis X. The ratchets 510 and 520 are arranged for operation on opposite sides of the lever 530, and are operable in opposite directions.

The driving parts 511 and 521 each have a ring of asymmetrical ratchet teeth on their toothed sides. The ratchet teeth are skewed in opposite directions as between the two parts, i.e. in anti-clockwise direction A on one part and clockwise direction B on the other part, for ratchet operation with the complementary ratchet teeth of the corresponding driven parts 512 and 522, in opposite directions as between the two ratchets 510 and 520.

Pivoting of the lever 530 in either direction L/R brings about turning of both driving parts 511 and 521 in the same direction, but only one of the driven parts 512 and 522 follows. The other driven part 522/512 will kick in instead upon return of the lever 530 in the opposite direction. This attributes to the ratchets 510 and 520 operating in opposite directions.

Referring to the first and second gear trains 540/560 and 550/560, they share a common gear in the form of a beveled gearwheel 560 lying horizontally on the base 220 of the head 200. This common gearwheel 560 has a central socket 561 which protrudes and extends downwardly through the base's hole 221 and the body's upper end hole 111 and is then coupled co-axially with the upper end of the operating shaft 310 of the grinding mechanism 300, for turning the shaft 310 in direction C (i.e. the operating direction).

Each of the first and second gear trains 540/560 and 550/560 includes one single other beveled gearwheel (referred to as side gearwheel) 540 or 550. These two side gearwheels 540 and 550 are disposed on opposite ends of the shaft 501, each right alongside and in axial engagement with the driven part 512/522 of the ratchet 510/520 on the same end of the shaft 501 for turning with or by the ratchet 510/520. To achieve this, each side gearwheel 540/550 has on its inner side a square recess that accommodates the adjacent driven part 512/522 of a matching shape for turning with or by the driven part 512/522.

The gears of the gear trains 540/560 and 550/560 other than their common gear 560, i.e. gearwheels 540 and 560, are supported for rotation about the common axis X, one single axis.

The common gearwheel 560 is positioned immediately below and right across the two side gearwheels 540 and 550, with its opposite left and right sides about its centre in mesh with the two side gearwheels 540 and 550 respectively.

Because the side gearwheels 540 and 550 are in mesh with opposite sides of the common gearwheel 560, they will turn in opposite directions A and B respectively with the common gearwheel 560 turning in direction C, and vice versa. In particular, the common gearwheel 560 will be turned in direction C (to turn the shaft 310 for operating the grinding mechanism 300) by the side gearwheel 540 turning in direction A or by the other side gearwheel 550 turning in direction B.

The first gear train 540/560 is provided by the side gearwheel 540 and the left side of the common gearwheel 560, and the second gear train 550/560 is provided by the other side gearwheel 550 and the right side of the common gearwheel 560. The left and right sides of the common gearwheel 560 function as part of the first and second gear trains 540/560 and 550/560 respectively.

Figure 1:
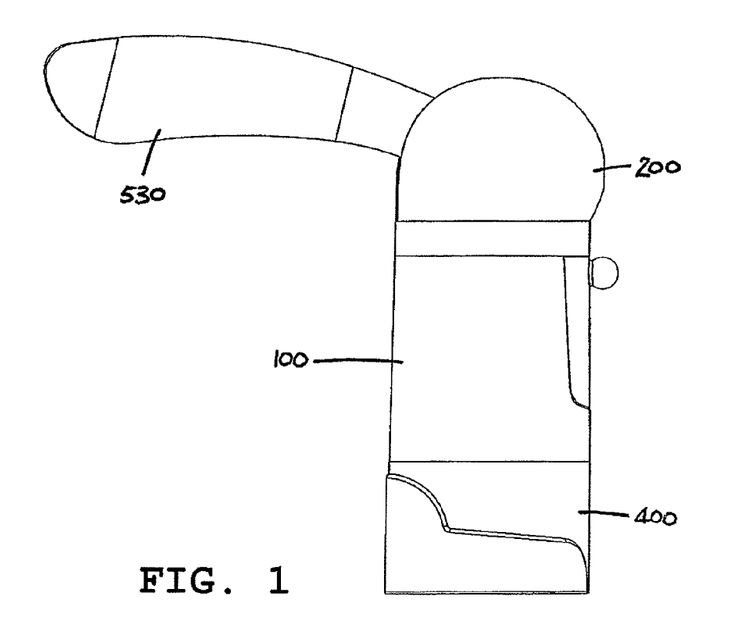
FIG. 1 is a side view of an embodiment of a condiment grinder in accordance with the invention.
Figure 2:
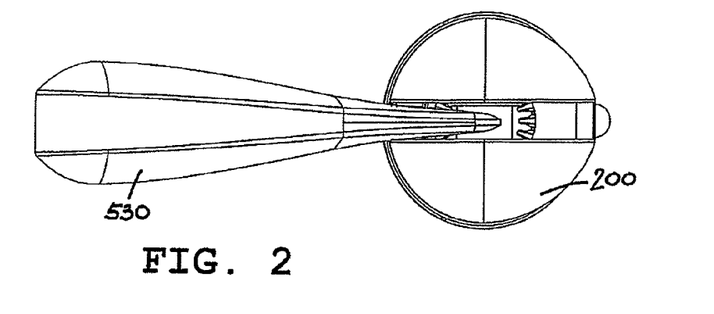
FIG. 2 is a top plan view of the condiment grinder of FIG. 1.
Figure 3:
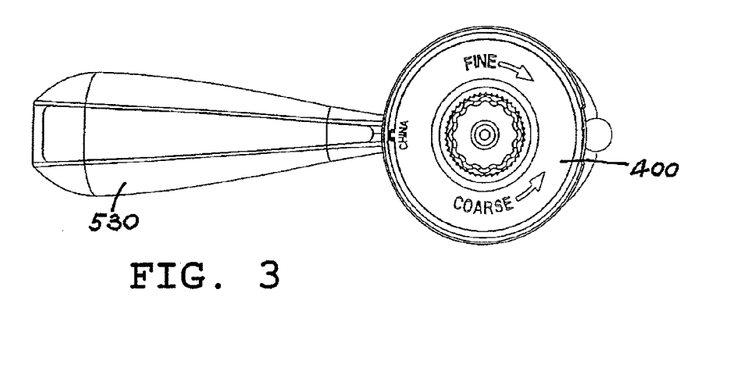
FIG. 3 is a bottom plan view of the condiment grinder of FIG. 1.
Figure 4:
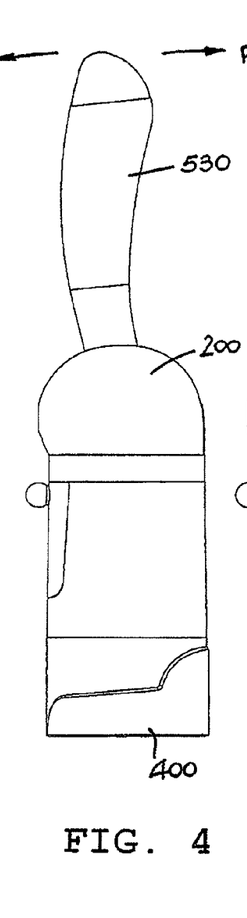
FIG. 4 is a side view of the condiment grinder of FIG. 1, showing an operating member thereof in an upright position.
Figure 4A:
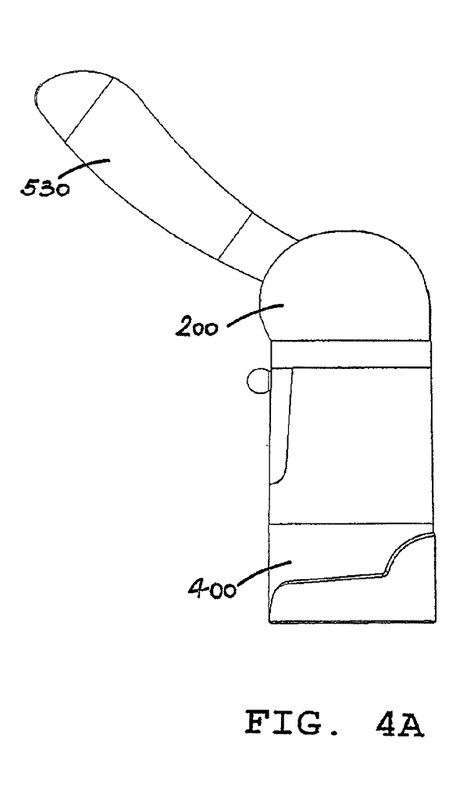
FIGS. 4A and 4B are side views similar to FIG. 4, showing the operating member pivoted to the left and to the right respectively for operating the condiment grinder.
Figure 4B:
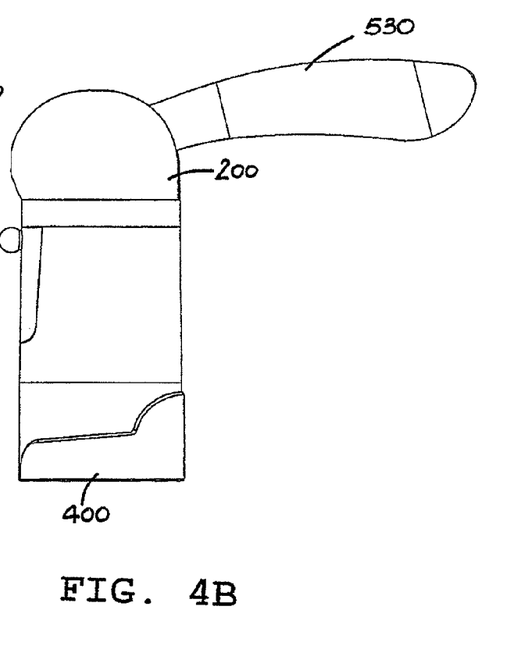
Figure 5:
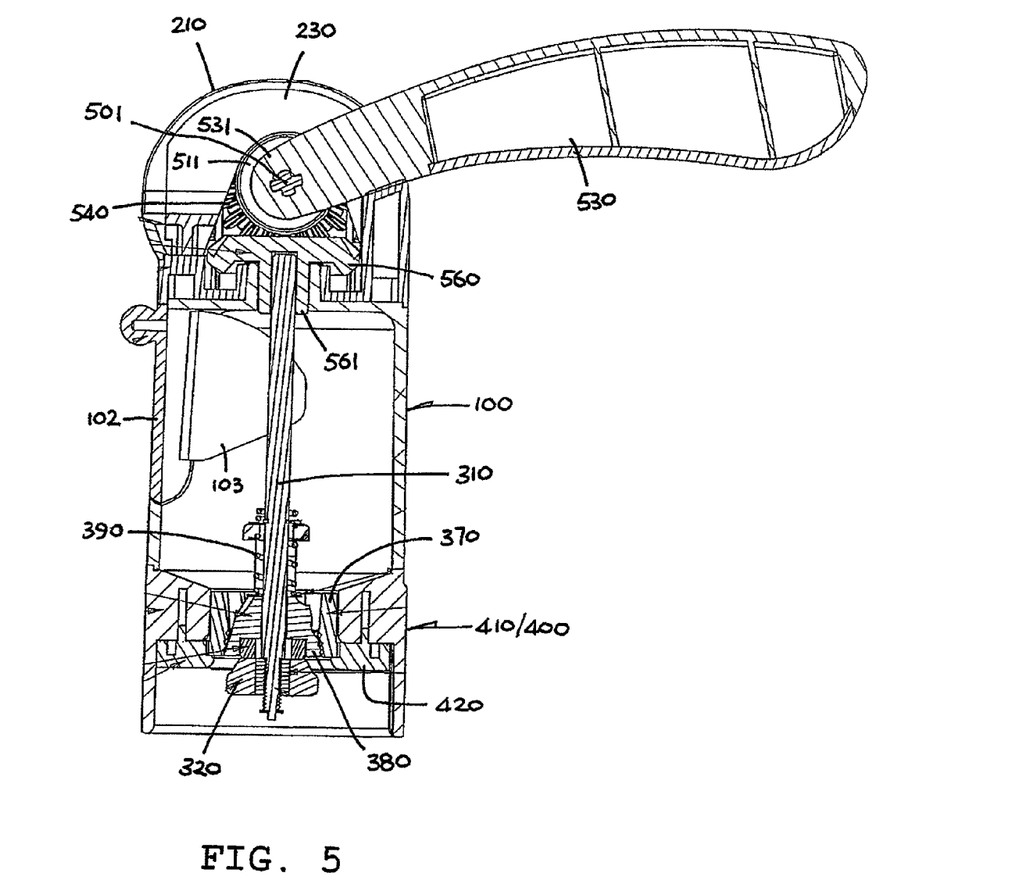
FIG. 5 is a cross-sectional side view of the condiment grinder of FIG. 1, showing its internal components.
Figure 6:
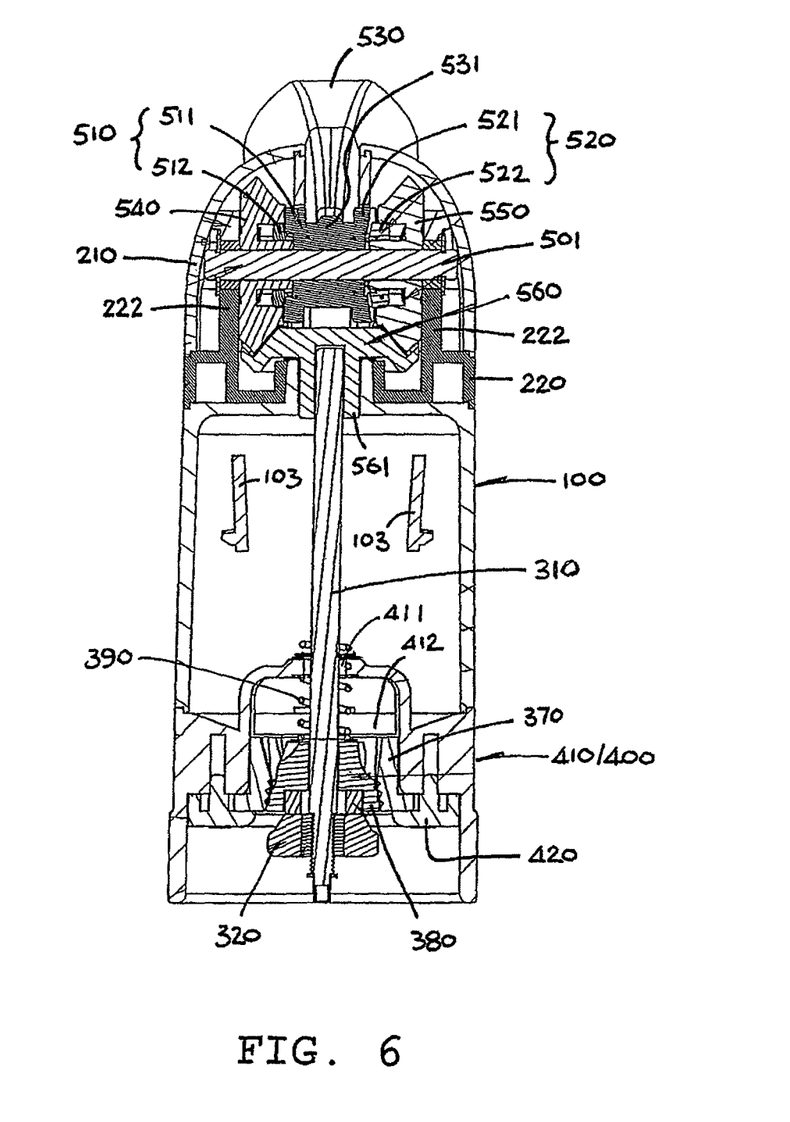
FIG. 6 is another cross-sectional side view of the condiment grinder of FIG. 1, showing its internal components.
Figure 7A:
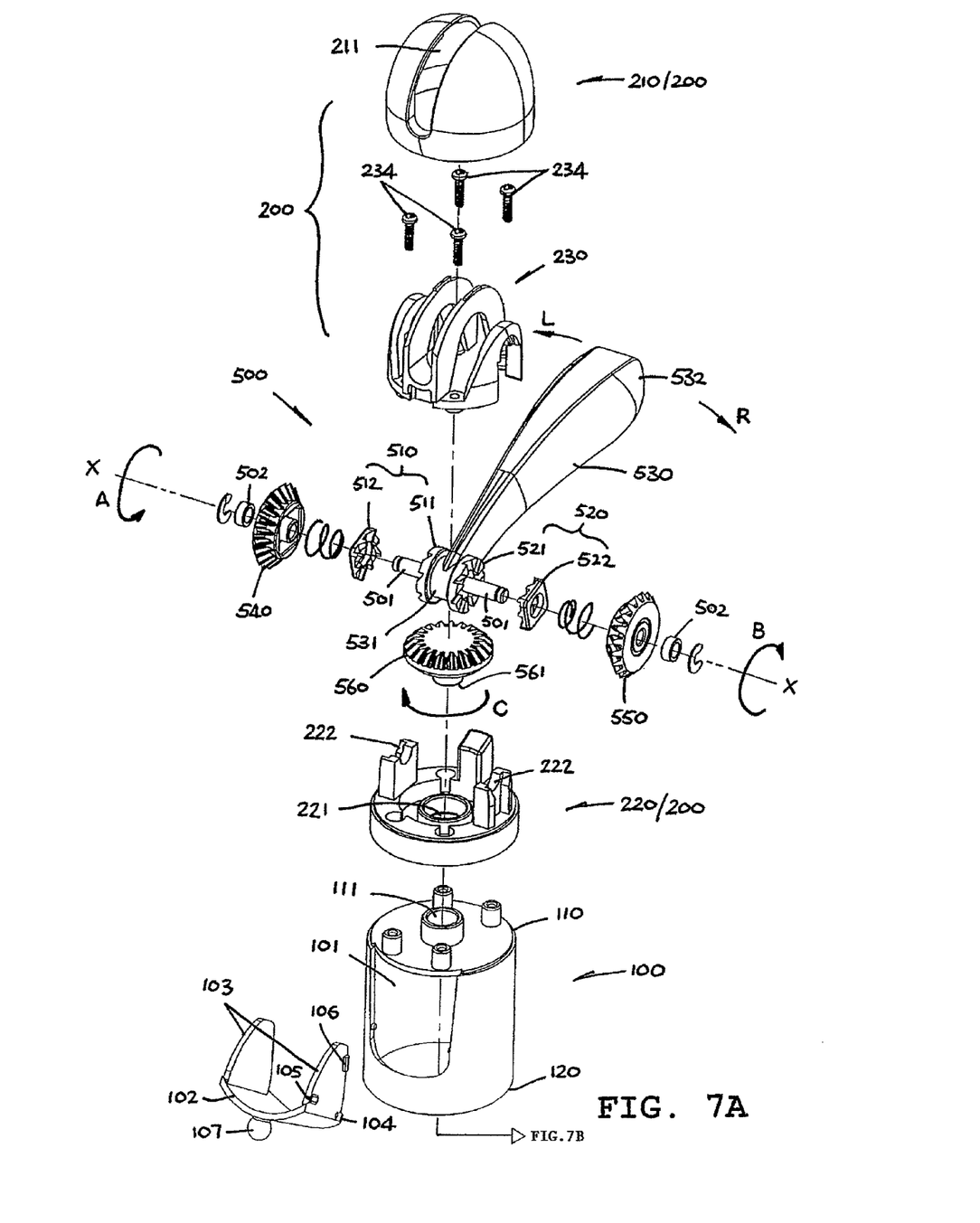
FIGS. 7A and 7B combined are an exploded perspective view of the condiment grinder in FIGS. 5 and 6, showing the internal components in separation.
Figure 7B:
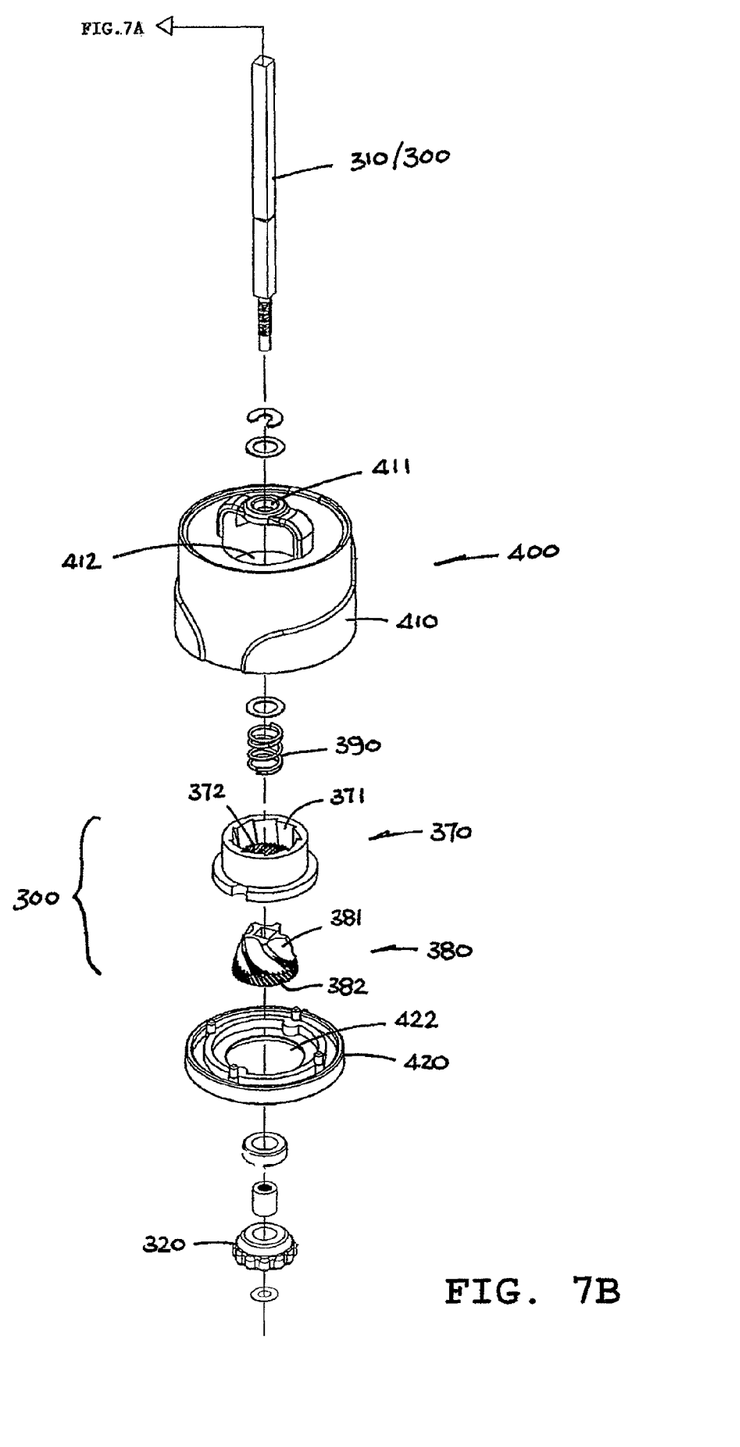

With the opposite ends of the shaft X being supported on the bearing blocks 222 via respective ring bearings 502, a generally dome-shaped hollow holder 230 (FIG. 7A) located on the head's base 220 bears from above upon the ring bearings 502 to hold the shaft X in position. In addition, the holder 230 has a middle section bearing from above upon the ratchets' driving parts 511 and 521 to hold the lever 530 in place by its the inner end 531. A set of four screws 234 secures the holder 230 on the head's base 220 and through the base 220 with the upper end 110 of the grinder body 100.

The operation of the pepper grinder is now described.

Upon pivoting of the lever 530 in direction L to the left, the first ratchet 510 transmits the lever's angular drive in direction A by reason of the teeth on its two parts 511 and 512 inter-engaging, and the second ratchet 520 slips by reason of the teeth on its two parts 521 and 522 disengaging to avoid counter rotation. The drive transmitted by the first ratchet 510 is simultaneously passed on by the first gear train 540/560 to the shaft 310 to turn the inner grinding member 380 in one direction C relative to the outer grinding member 370 for grinding pepper.

Upon pivoting of the lever 530 in the opposite direction R to the right, the second ratchet 520 transmits the lever's angular drive in direction B by reason of the teeth on its two parts 521 and 522 inter-engaging, and the first ratchet 510 slips by reason of the teeth on its two parts 511 and 512 disengaging to avoid counter rotation. The drive transmitted by the second ratchet 520 is simultaneously passed on by the second gear train 550/560 to the shaft 310 to turn the inner grinding member 380 in the same direction C relative to the outer grinding member 370 for grinding pepper.

Overall, upon reciprocating pivoting of the lever 530 in opposite directions L and R, the ratchets 510 and 520 take turns to transmit the angular drive from the lever 530, via their associated gear trains 540/560 and 550/560 respectively, to the shaft 310 to turn in direction C for operating the grinding mechanism 300 in a unidirectional manner. The grinding mechanism 300 thus turns and functions practically continuously, for as long as the lever 530 is being pivoted back and forth.

The two gear trains 540/560 and 550/560 serve to transmit the angular drive from the lever 530, alternately via the respective ratchets 510 and 520, to the shaft 310 for operating the grinding mechanism 300. The two ratchets 510 and 520 are arranged to translate the reciprocating movement of the lever 530 in the opposite directions L and R into unidirectional rotary movement of the shaft 310 of the grinding mechanism 300. In general, via the two ratchets 510 and 520 and associated gear trains 540/560 and 550/560 respectively, the aforesaid first and second drive transmission paths are alternative paths running in parallel from the lever 530 to the shaft 310 for operating the grinding mechanism 300.

As is apparent from the pepper grinder described above, the subject invention provides a condiment grinder that is operated by manually reciprocating an operating member in opposite directions to produce drive that is transmitted by ratchets, taking turns or in alternate operation, from the operating member to the grinding mechanism in a unidirectional manner. Each return stroke of the operating member is also effective and equally productive, and this makes the condiment grinder of the invention faster, doubly as fast, in grinding condiment into powder.

For optimum performance, such as the speed of grinding, the operating member if pivotable, as in the case of the described lever 530, should be made pivotable through an angle greater than 120°.

It is envisaged that, in different embodiments of the invention, the operating member may be arranged to reciprocate through rotary motion or linear sliding movement, instead of pivotal movement as described above. As to the grinding mechanism, its construction is not restricted to the rotary type as described herein. All other types are intended to be covered, such as the mechanism that involves the use of grinding members in the form of a pair of inclined planes.

The invention has been given by way of example only, and various other modifications and/or variations to the described embodiment may be made by persons skilled in the art without departing from the scope of the invention as specified in the accompanying claims.

The invention claimed is:

1. A condiment grinder comprising:
   a body for containing a condiment;
   a grinding mechanism for grinding the condiment in the body, the grinding mechanism comprising first and second grinding members between which the condiment is ground upon relative movement between the first and second grinding members; and
   a drive mechanism for driving and operating the grinding mechanism by causing relative movement between the first and second grinding members to grind the condiment, the drive mechanism comprising:
      an operating member supported for reciprocating movement in opposite first and second directions, relative to the body, to produced a driving force,
      a first ratchet arranged to transmit the driving force from the operating member, upon pivotal movement of the operating member in the first direction, and causing relative movement between the first and second grinding members in a third direction to grind the condiment, and
      a second ratchet arranged to transmit the driving force from the operating member, upon pivotal movement of the operating member in the second direction, and causing relative movement between the first and second grinding members in the third direction to grind the condiment, wherein, upon reciprocating movement of the operating member in the opposite first and second directions, the first and second ratchets alternate in transmitting the driving force from the operating member to the grinding mechanism.

2. The condiment grinder as claimed in claim 1, wherein the grinding mechanism includes an operating shaft in driving engagement with the first grinding member and supported for movement to move the first grinding member relative to the second grinding member.

3. The condiment grinder as claimed in claim 2, wherein the first grinding member is supported co-axially in the second grinding member for rotation relative to the first grinding member, the first and second grinding members being spaced apart by an annular gap in which the condiment to be ground is located.

4. The condiment grinder as claimed in claim 2, wherein the first and second ratchets are arranged to translate the reciprocating movement of the operating member in the opposite first and second directions into unidirectional rotary movement of the operating shaft.

5. The condiment grinder as claimed in claim 2, wherein the drive mechanism includes
   a first gear train in a first drive transmission path from the operating member to the operating shaft, the first gear train including the first ratchet, and
   a second gear train in a second drive transmission path from the operating member to the operating shaft, the second gear train including the second ratchet, the first and second gear trains transmitting the driving force from the operating member alternately, via the first and second ratchets, respectively, to the operating shaft.

6. The condiment grinder as claimed in claim 5, wherein
   the first gear train is in drive engagement between the first ratchet and the operating shaft, and
   the second gear train is in drive engagement between the second ratchet and the operating shaft.

7. The condiment grinder as claimed in claim 5, wherein the first and second gear trains share a common gear in drive engagement with the operating shaft.

8. The condiment grinder as claimed in claim 7, wherein the common gear comprises a gearwheel having opposite left and right sides about a center, the left side of the gearwheel being part of the first gear train and the right side of the gearwheel being part of the second gear train.

9. The condiment grinder as claimed in claim 8, wherein
   the first and second gear trains include respective first and second beveled gearwheels rotatable about a common axis and in mesh with the opposite left and right sides of the common gear, and
   the common gear is a third beveled gearwheel.

10. The condiment grinder as claimed in claim 7, wherein the first and second gear trains, include gears in addition to the common gear, and the gears of first and second gear trains are supported for rotation about a single axis.

11. The condiment grinder as claimed in claim 10, wherein the first and second ratchets are also supported for turning about the single axis.

12. The condiment grinder as claimed in claim 1, wherein the first and second ratchets are arranged on opposite sides of the operating member and are operable in opposite directions.

13. The condiment grinder as claimed in claim 12, wherein each of the first and second ratchets includes a driving part, movable with the operating member, and a driven part, respectively in drive engagement with the first and second gear train.

14. The condiment grinder as claimed in claim 1, wherein each of the first and second ratchets includes a driving part and an associated driven part, the driving parts being supported for simultaneous turning about a common axis and arranged back-to-back, having outer sides bearing ratchet teeth skewed in opposite directions for ratchet operation, with co-operating skewed ratchet teeth of the associated driven parts that are driven in opposite directions.

15. The condiment grinder as claimed in claim 1, wherein the operating member is supported for reciprocating angular movement in the opposite first and second directions relative to the body.

16. The condiment grinder as claimed in claim 15, wherein the operating member comprises a lever having an inner end associated with the drive mechanism and an outer end for manual operation.

17. The condiment grinder as claimed in claim 16, wherein the lever is pivotable through an angle greater than 120°.

18. The condiment grinder as claimed in claim 1, including
   a head on a first end of the body and in which the drive mechanism is located, and
   a base at a second end of the body in which the grinding mechanism is located.

19. The condiment grinder as claimed in claim 1, wherein the grinder is a handheld pepper grinder.

* * * * *